United States Patent [19]

Grewe et al.

[11] 4,272,564
[45] Jun. 9, 1981

[54] FLEXIBLE REFLEX-REFLECTIVE ARTICLE HAVING UNDULANT SURFACE AND METHOD OF MAKING THE SAME

[75] Inventors: Josef Grewe; Philip Portner, both of Hagerstown, Md.

[73] Assignee: C. M. Offray & Son, Inc., New York, N.Y.

[21] Appl. No.: 52,454

[22] Filed: Jun. 27, 1979

[51] Int. Cl.³ .................... G02B 5/128; B05D 5/06; B05D 3/12
[52] U.S. Cl. .................................. 427/163; 350/105
[58] Field of Search .................................. 2/14–17; 350/109, 97–106, 320, 321; 404/12–14; 23/326; 427/163

[56] References Cited

U.S. PATENT DOCUMENTS

| | | | |
|---|---|---|---|
| 3,702,213 | 11/1972 | Schwab | 350/105 |
| 3,989,775 | 11/1976 | Jack et al. | 350/105 X |
| 4,102,562 | 7/1978 | Harper et al. | 350/97 X |

Primary Examiner—James R. Hoffman
Attorney, Agent, or Firm—Mark T. Basseches; Paula T. Basseches

[57] ABSTRACT

The present invention is directed to a flexible reflex-reflective article, such as a ribbon, wherein the reflective pattern evinces an undulant surface, and to the method of making the same. The invention is directed more particularly to an article of the type described wherein the reflex-reflectivity effect is produced by glass or like spheres embedded into an adhesive carrier surface to a depth at least equal to and preferably beyond the equator of the spheres, whereby the resultant product may be flexed, dry cleaned, twisted and similarly handled without loss of the reflex-reflective spheres. The invention further pertains to a method of making an article of the type described wherein the spheres are arrayed in an undulant pattern surface and yet are embedded within the carrier to an extent which will prevent their dislodgement under normal use.

14 Claims, 7 Drawing Figures

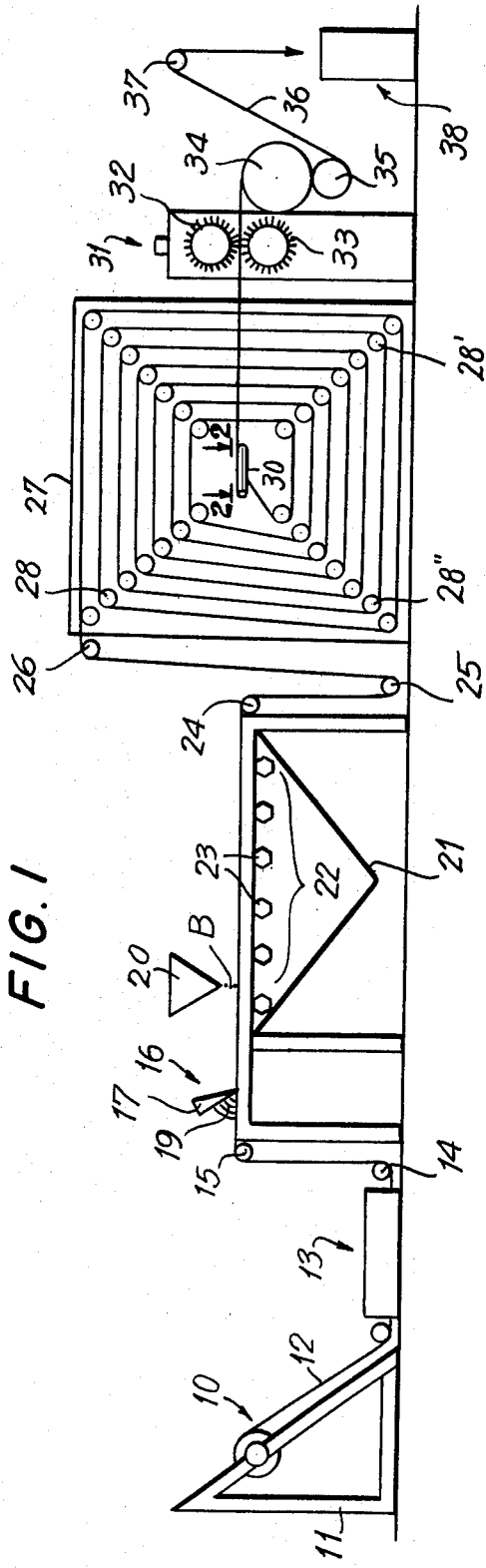
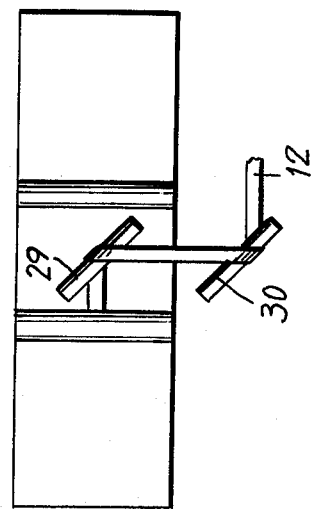
FIG.1
FIG.2

FLEXIBLE REFLEX-REFLECTIVE ARTICLE HAVING UNDULANT SURFACE AND METHOD OF MAKING THE SAME

BACKGROUND OF THE INVENTION

1. Field of the Invention

The present invention is in the field of a flexible reflex-reflective article and method of making the same.

2. The Prior Art

It is known per se to provide reflex-reflective articles, such as highway signs, license plates, highway markings and the like which will retro-reflect light which strikes it at a small angle with respect to the material by embedding in a coating or carrier having reflective flakes or the like a multiplicity of minute glass spheres. By way of example, processes and articles pertaining to retro-reflectivity utilizing spheres are disclosed in one or more of the following U.S. Pat. Nos.:

| 2354,018 | Heltzer | 2354,049 | Palmquist |
|---|---|---|---|
| 2399,741 | Palmquist | 2383,884 | Palmquist |
| 2555,715 | Tatum | 2574,971 | Heltzer |
| 2963,378 | Palmquist | 3989,775 | Jack |
| 3934,065 | Tung | 3915,771 | Gatzke |
| | 3877,787 | Buzbee | |

It is desirable for purposes of safety that the retro-reflective surface be undulant (such term as hereinafter used pertaining to a three dimensional or pattern array, as opposed to a flat surface) since, in view of the narrow angle reflective properties of the spheres, an undulant surface will provide a greater likelihood of haphazard light impinged against the retro-reflective surface being perceived by a viewer than would a flat retro-reflective surface.

The provision of undulant or corrugated reflex-reflective surfaces on materials which will not be flexed or bent in use provides no special problems since it is merely necessary to coat a surface having the desired undulant or corrugated characteristics with a suitable binder and apply a layer of spheres to the surface. However, the provision of a reflex-reflective article, such as a fabric or the like, which has both an undulant surface characteristic for optimum safety and which also is capable of being laundered, flexed, bent twisted and creased without loss of reflex-reflectivity presents special problems. These problems arise since the glass spheres, for permanence of connection, must be embedded into the carrier material to a substantial depth, normally at least equal to and preferably beyond the equator, so that they will not become dislodged in handling.

While it is a simple matter to embed the spheres to a desired depth on a flat surface, there are no known procedures for accurately controlling the embedment of the spheres on an undulant surface.

It has heretofore been suggested, in accordance by way of example, with U.S. Pat. No. 3,989,775, to apply a mono layer of spheres to an embossable plastic material, embed the spheres into the plastic while the same is in a flatwise condition, and thereafter emboss the plastic to a desired pattern to achieve the desired undulant surface whereby light incident at a large angle to the plane of the surface of the material will nonetheless be perceived by a viewer looking at the material in a direction normal to the plane thereof.

The material which is the subject of said patent, however, must be embossable plastic and, thus, cannot have the "hand" or feel of a fabric. Moreover, in order to achieve a desired undulant effect, it is necessary to provide an embossing die specific to each desired characteristic of the material, i.e. if a fine pattern is desired, a fine grain embossing die is needed, etc.

Additionally, an article in accordance with the subject patent does not permit of dry cleaning, washing, wringing or rough handling.

SUMMARY OF THE INVENTION

The present invention may be summarized as directed to a method for forming a fabric having a retro-reflective undulant surface wherein the surface configurations, undulations or corrugations are determined essentially by the characteristics of the fabric selected, the resultant product being susceptible of rough handling, laundering, dry cleaning and like treatments without loss of its retro-reflective properties through dislodgement of the spheres.

More particularly, the invention relates to a method of making a retro-reflective fabric article, such as a ribbon, which may be applied to clothing or like articles which will be laundered or dry cleaned and which article will exhibit an undulant or corrugated surface corresponding essentially to the undulant surface of the underlying fabric.

The invention further pertains to a method of manufacturing a flexible, retro-reflective article having an undulant surface without the use of embossing dies.

The invention further pertains to a method of manufacturing a retro-reflective article which includes minute glass spheres arrayed in an undulant pattern conforming generally to the configuration of the underlying surface, the spheres nonetheless being deeply embedded in the carrier matrix whereby they are highly resistant to dislodgement despite folding, wringing, creasing, etc.

The invention, in its broadest aspects, involves providing a substrate, such as a grosgrain ribbon or like fabric having a desired undulant surface configuration, applying to such fabric a layer of carrier material, such as adhesive or the like, which layer includes an under surface conforming to the undulant configuration of the carrier web of fabric, and an upper surface which is essentially flat. The carrier is applied in liquid form and is selected to have the property of high shrinkage in cure. The carrier material, which may incorporate the desired reflective pigmentation or flake, has applied to the exposed surface thereof a mono layer of retro-reflective spheres, the spheres being initially applied so as to be supported on but not substantially embedded in the layer.

The layer is partially cured so as to increase the viscosity thereof, and thereafter, while the layer is still essentially flat, a transverse pressure is applied to the spheres whereby the same are embedded into the matrix of the adhesive layer to a desired degree, e.g. to the equator or to a depth such that only 25% of the depth of the spheres projects beyond the surface of the layer. Thereafter, cure is completed, with consequent substantial shrinkage of the adhesive layer.

The adhesive layer as initially applied will be substantially thicker in those areas in registry with the valleys of the undulant substrate than in those areas in registry with the peaks of the undulant substrate. On cure, the layer will shrink to a degree essentially proportionate to the thickness of the layer at any particular point. Thus by virtue of the shrinkage effects described, those thicker portions of the adhesive layer in registry with the valleys of the substrate will shrink to a greater degree than those thinner areas in registry with the peaks of the underlying substrate, providing in the exposed surface of the adhesive an undulant configuration corresponding essentially to or approximating the undulant configuration or pattern of the substrate.

The spheres which, prior to cure, define an essentially flat mono layer will, by reason of the shrinkage effects, be differentially drawn downward toward the underlying web or substrate, such that the exposed surfaces of the spheres will themselves be arrayed in an undulant configuration.

Additionally, it will be observed that since the spheres are embedded into the adhesive layer at a point of time at which the adhesive layer is essentially flat, the degree of embedding of the spheres may be accurately controlled, whereby there is provided, without the use of embossing dies or the like, a fabric, ribbon or like retro-reflective article having a desired undulant surface wherein the retro-reflective spheres are embedded to a predetermined and readily controlled degree sufficient to preclude their dislodgement even under washing, folding or creasing conditions.

The invention further pertains to a novel retro-reflective fabric, such as a ribbon, having an undulant surface wherein the point of tangency of the spheres at the outermost surface thereof conforms essentially to the undulations or irregularities of the underlying support substrate. The resultant product, by virtue of the simulation by the spheres of the pattern of the fabric or ribbon looks to the naked eye in a high incident light situation, e.g. daylight, like a conventional ribbon product. At night, the product exhibits the desired retro-reflectivity.

It is thus possible for the first time to provide a product having the safety features of a retro-reflective material without the shiny, synthetic and artificial appearance heretofore associated with retro-reflective materials.

Whereas heretofore it has been conventional, in order to assure against dislodgement of the retro-reflective spheres, to provide a protective polymeric coating over the retro-reflective surface, the present invention permits the omission of such protective coating without loss of permanence of the retro-reflective material.

Accordingly, it is an object of the invention to provide a flexible retro-reflective article, such as ribbon, having an undulant surface.

A further object of the invention is the provision of an article of the type described wherein the retro-reflective surface constitutes, to a degree, a simulation of the undulant configuration of an under surface or substrate to which the reflective surface is applied.

A still further object of the invention is the provision of an article of the type described wherein the retro-reflective spheres are embedded in a carrier coating to a predictable and desired degree, whereby the resultant product may be folded, laundered and subjected to dry cleaning processes without loss of the retro-reflective characteristics.

Still a further object of the invention is the provision of a method of forming an article of the type described without resorting to the use of embossing dies or stamps, and without the necessity for providing a retaining over-coating or layer to maintain the reflective spheres in position on the article.

A further object of the invention is the provision of a method for forming a flexible article of the type described, which method involves providing a support surface or web which is undulant, coating the surface or web with a carrier adhesive which is shrinkable in the course of cure, applying to the essentially flat surface of the uncured carrier a series of retro-reflective spheres, embedding the spheres into the carrier to a desired degree in advance of cure, and thereafter causing the carrier layer to cure and shrink in dimension, the amount of shrinkage being essentially proportionate to the thickness of the carrier coating at each given point whereby, upon shrinkage of the coating, the initially flat surface of the carrier will assume a configuration essentially a replica or simulation of the undulant configuration of the web.

To attain these objects and such further objects as may appear herein or be hereinafter pointed out, reference is made to the accompanying drawings, forming a part hereof, in which:

FIG. 1 is a diagrammatic view of an apparatus for practicing the method of the invention;

FIG. 2 is a fragmentary plan view taken in the direction of the arrows 2—2 of FIG. 1;

Figure 3:
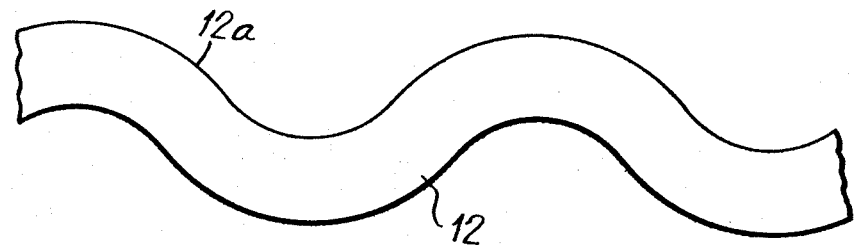

FIGS. 3 to 7 constitute successive diagrammatic views of an article in the course of formation.

Referring now to the drawings, the invention will be described in conjunction with the fabrication of a ribbon product, it being understood that the utility of the article and method of forming the same are not to be considered as limited to the formation of ribbons.

Additionally, the particular fabric diagrammatically illustrated is commonly known in the trade as a grosgrain or rib weave ribbon, although it will be understood that the invention may be advantageously employed with virtually any fabric or substrate having an undulant surface.

Referring now to FIG. 1, a take-off spool 10 of ribbon is mounted on a frame 11. The ribbon may be a grosgrain polyester having, by way of example and without limitation, approximately 20 to 40 ribs per lineal inch. The ribbon is fed from the spool through a tensioning station 13 which precisely adjusts the tension on the ribbon, under guide roller 14, over alignment roller 15 and into a coating station 16.

The coating station 16, which is known per se, applies across the upper surface of the ribbon 12 or along a stripe or segment of the surface or at spaced intervals therealong a coating of a liquid adhesive carrier, the formulation of which will be set forth hereinafter.

The coating station 16 includes a doctor blade 17 or like thickness metering apparatus disposed in predetermined and precisely spaced relation to the coating table 18, whereby the thickness of the adhesive or carrier coating to be applied to the ribbon may be controlled within precise limits.

There is shown at 19 a supply of the carrier material in liquid form, the carrier material being, as noted above, spread in a layer of predetermined thickness, normally to a wet coating thickness of between 0.010" to about 0.015". The thickness of the coating may vary from the figures given and is dependent upon a number of factors including the coarseness of the weave of the fabric and the covering power (opacity) of the reflective filled adhesive liquid.

It is the objective of the coating procedure to provide a layer of the adhesive having a flat upper surface and having its under surface conforming to the undulations of the fabric or carrier web. As will be more fully understood hereinafter, the thickness of the layer should be sufficient to permit the retro-reflective spheres to be embedded therein to a depth at least to the equator and preferably slightly therebeyond. However, the use of too thick a layer should be avoided since, after curing, a thinner layer will more accurately reproduce the undulant pattern of the carrier web.

After spreading of the adhesive, the wet and highly tacky surface is sprinkled with a supply of retro-reflective spheres or beads B from a bulk supply at bead hopper 20. The beads B are released at a rate which will more than cover all of the exposed adhesive surface, the excess of spheres being caught in collector hopper 21 disposed beneath the bead hopper 20 for subsequent reuse.

The reflective spheres are known per se, satisfactory results having been achieved with a coating of the thickness hereinabove set forth utilizing spheres or beads having a refractive index of 1.91 and an average diameter of 0.0024" to 0.0035".

In order to facilitate feed of a continuous supply of the beads, the bead hopper 20 may be subjected to continuous vibration.

Suitable glass beads are available in a variety of size ranges and refractive indices from the Cataphote Division of Ferro Corporation of Jackson, Miss.

The bead coated ribbon is advanced across a beater station 22 comprised of a series of hexagonal beater bars 23 which are rotated about axes transverse to the direction of advance of the ribbon at about 250 rpm, the under or uncoated surface of the ribbon being engaged against the periphery of the rotating beater bars whereby the ribbon is gently vibrated or oscillated so as to remove any excess of beads and thus define a mono layer of beads in contact with the adhesive compound.

The ribbon is maintained under constant tension during the processing steps, the tension varying in accordance with the width of the ribbon. By way of example, a ribbon ⅝" in width is maintained under a pulling force of approximately 300 grams and a 1¼" wide ribbon under a pulling force of about 720 grams.

The ribbon emerging from the beater station 22 is passed over guide roller 24 and tensioning or dancer roller 25, over input guide roller 26 and into the interior of a drying or curing oven 27.

The oven 27 may include a plurality of spacer rollers 28 arranged in cruciform pattern such as to guide the ribbon being dried about a path defining essentially progressively smaller squares. It will be understood that the under or uncoated surface of the ribbon is initially engaged against the spacer rollers 28. The beads falling under gravitational influence against the adhesive will impact against the adhesive and approximately 10 to 15% of the diameter of the beads or spheres will become embedded into the adhesive layer.

This degree of embedment would clearly be insufficient, if the adhesive were cured, to retain the beads to the adhesive when the ribbon was subjected to the rigors of washing, cleaning or like handling. On the other hand, if any force were applied against the surface of the beads, urging the beads toward the carrier web 12 in the essentially uncured condition of the carrier adhesive, the beads would be completely or substantially completely immersed within the thicker layer of adhesive, whereby the desired retro-reflective effects would be lost.

In order to assure that the beads are embedded into the layer to a desired and repeatable degree, the ribbon is maintained within the drying-curing oven for a predetermined time period calculated partially to cure the adhesive and increase its viscosity. After partial cure of the adhesive, the desired embedding of the beads is achieved by inverting or twisting the ribbon such that the bead coated surface of the adhesive is innermost in the array and thus engages against the subsequent spacer rollers 28.

By way of example, the ribbon may be twisted 180° between rollers 28' and 28", whereafter, it will be appreciated, that all subsequent spacer rollers 28 will be engaged against and function further to embed the beads into the adhesive layer.

It will be readily recognized that the achievement of a desired embedment of the beads will be a function of a variety of factors, including the drawing force exerted on the ribbon, width of the ribbon, viscosity of the adhesive, thickness of the adhesive layer, drying temperature, speed of advance of the ribbon, etc. Accordingly, a degree of trial and error must ordinarily be expected when changes in any of the noted parameters are introduced.

The ribbon emerges from the drying-curing oven in an angled direction as a result of its passage over angled rollers 29, 30—see FIG. 2, after which the ribbon is passed through a cleaner station 31 whereat the ribbon is passed between cylindrical rotating cleaner brushes 32, 33 while simultaneously being subjected to vacuum. The ribbon is advanced through the apparatus noted by paired pulling rollers 34, 35, the fully formed ribbon 36 having the desired retro-reflective coating being led over guide roller 37 to a storage or packaging station 38.

By way of example, and employing an adhesive composition of an initial thickness of 0.013", total drying time within the drying-curing oven of 6.5 minutes is required where the oven is maintained at 182° F. Clearly, the drying time will depend, inter alia, on the porosity of the fabric carrier, being less where solvents of the adhesive are free to evaporate both from the surface coating and from the body of the support web.

Desirably, the spacer roller 28" and those following may be coated with TEFLON (trademark) so as to minimize the possibility of adherence between the rollers and the adhesive layer.

An apparatus and method in accordance with that described is particularly desirable in the processing of the ribbon in that the degree of embedding of the spheres into the adhesive surface may be readiy adjusted by simply inverting the ribbon at an earlier stage in the drying process if the beads are not sufficiently deeply embedded, or at a later stage if they are found, as a result of a trial run, to be too deeply embedded.

Referring now to FIGS. 3 through 7, the manner in which the initially flat bead layer is caused to assume an undulant configuration is schematically illustrated.

In FIG. 3 there is shown the representation of the uncoated ribbon or fabric 12 having an undulance, rib or corrugation defining a regular or irregular three dimensional pattern at least on its upper surface 12a.

Figure 4:
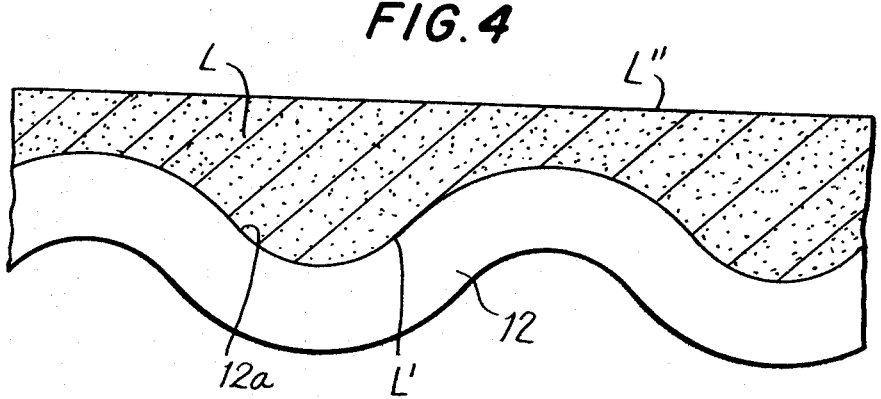

In FIG. 4, the ribbon 12, and particularly the undulant surface 12a thereof, has been coated by a layer L of adhesive composition, it being observed that the under surface L' of the layer conforms to the configuration of the undulant surface 12a whereas the upper face L" of the layer L is essentially flat or planar as a result of the use of a doctor blade applicator.

Figure 5:
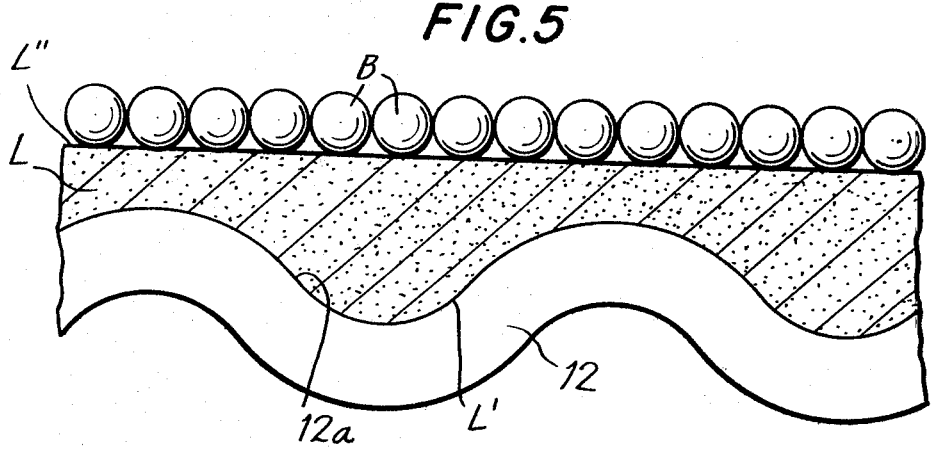

In FIG. 5, the beads B have been deposited on the tacky surface L", the beads being slightly embedded into the surface under the influence of gravity, whereby the beads are retained in a mono layer by the adhesive.

Figure 6:
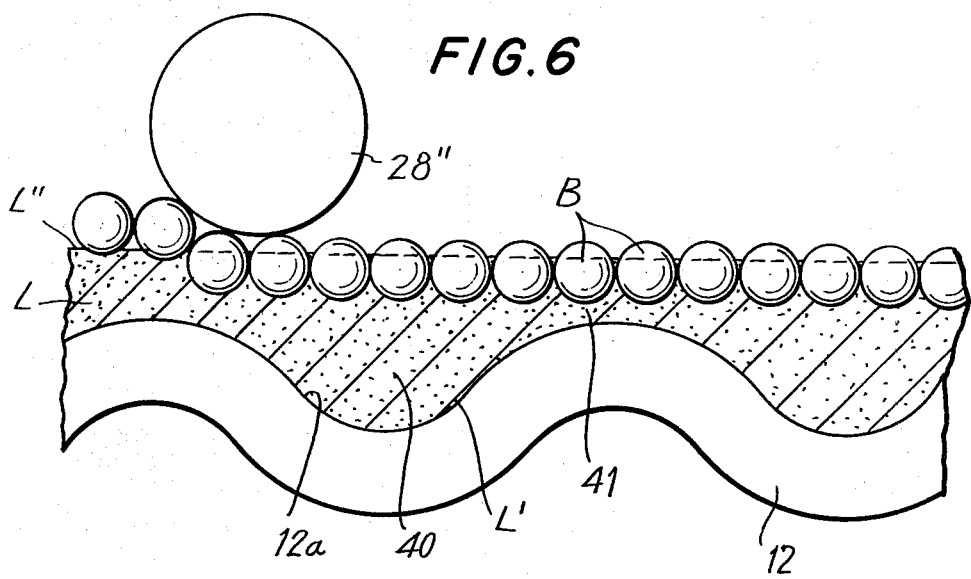

In FIG. 6, the beads B have been embedded to a desired degree into the layer L by the roller 28" and those following in the drying-curing oven.

Figure 7:
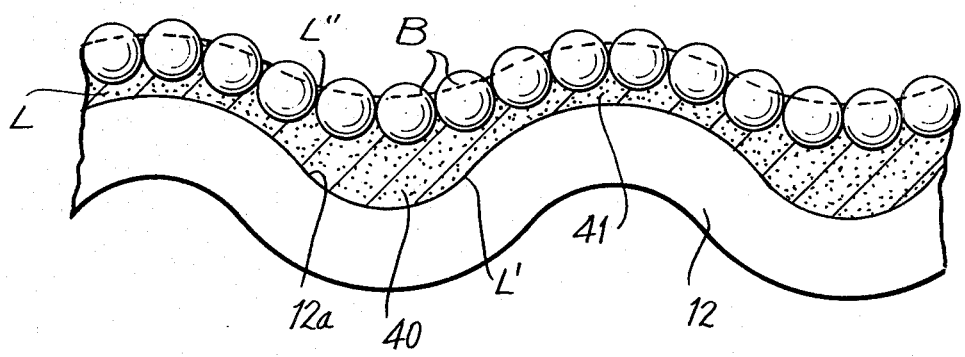

As diagrammatically illustrated by a comparison of FIGS. 6 and 7, it will be seen that the thickness of the partially cured layer L, FIG. 6, is substantially greater than the thickness of the fully cured layer L, FIG. 7, at any comparable point.

It will be further recognized that by virtue of the high shrink properties of the adhesive layer, the amount of shrinkage of the layer L is greatest in those areas where the layer L is thickest, i.e. in the areas 40 above a valley in the supporting ribbon. Conversely, the amount of shrinkage of the layer L is smallest in the areas 41 above a peak in the ribbon 12 where the layer L is thinnest.

It will thus be seen (FIG. 7) that the differential shrinkage of the layer L has caused the exposed surface of the beads to assume an undulant configuration constituting a replica of the configuration of the surface 12a of the ribbon.

As a practical matter it has been determined that to assure a meaningful deflection of the beads, the adhesive should be selected to have a shrinkage factor of 100% or more.

By way of illustration and without limitation, there are described below two suitable carrier coating formulations for obtaining the desired undulant effects.

EXAMPLE I—Silver Reflective Coating

To 150 grams of an aliphatic polyester urethane solution (30% solids content dissolved in dimethylformamide (D.M.F)/toluene/isopropanol alcohol 1:2:1.5 there are added 50 grams of a nitrocellulose lacquer (approximately 30% solids content in suitable solvent)

10 grams of aluminum (litho) powder (non-leafing flake 11% maximum retention on 325 mesh screen)

25 grams D.M.F. solvent.

The polyester urethane solution is available as a stock material from the Varona Dyestuff Division of Mobay Chemical Corporation, Union Metropolitan Park, Union, N.J., and is sold under the trademark IMPRANIL 392.

The properties of this material are incorporated in Technical Data Sheet #1433/2, published by the subject organization and dated May, 1976.

The viscosity of the coating composition is approximately 15,000 cps at 25° C. The reflective coating composition, after cure, in the thickness ranges noted forms a tough, highly flexible film which pockets about and tenaciously retains the glass beads and is highly resistant to washing and dry cleaning reagents and manipulations. Where the ability to resist dry cleaning is not a critical factor, a variety of alternate polymeric film forming carriers, such as vinyl based carriers, etc. may be suitably substituted for the polyester urethane.

A significant factor to be considered in selecting an appropriate carrier is that the same evince a high shrink factor in the course of drying or cure. Normally a shrinkage of at least about 100% is desirable and formulations with shrinkage of up to 500% have been successfully employed. The silver reflective coating described above has, by way of example, a shrink factor of about 300%. More particularly, a coating having an initial average thickness of about 0.013" is, after cure, reduced in thickness to about 0.004".

EXAMPLE II—White Reflective Coating

A white reflective coating suitably employed as a carrier for the retro-reflective beads may be formulated as follows:

150 grams polyester urethane solution as above identified 50 grams nitrocellulose lacquer as above identified (clear or with titanium dioxide pigment, depending upon the desired opacity)

20 grams pearlescent pigment 25 grams D.M.F.

A suitable pearlescent pigment (coated mica flakes) is available from the Mearl Corporation, 41 East 42nd Street, New York, N.Y. 10017 and is sold by that organization under the identifying trademark MEARLIN.

The pigments, which are plate of flake-like in configuration, are available in a wide variety of particle sizes, a size suitably employed in the white formulation noted above incorporating an average particle size (largest dimension) in the range of from about 5 to 40 microns.

The shrinkage factor of the above film is approximately the same as that of Example I.

As will be understood by those skilled in the art of forming retro-reflective coatings, a wide variety of effects may be achieved by suitably varying pigments and colorants employed, the size and nature of the reflective flakes and retro-reflective spheres, etc., a principal factor of significance to the present invention being the utilization of a carrier having a high shrink factor in the course of drying or curing.

The undulance of the exposed surface of the beads in the finished product will be determined in large measure by the undulant nature of the carrier web. Since in no case can the three dimensional effect in the bead surface equal or exceed the degree of undulance in the carrier web itself, it is best to select a web having a greater or more sinuous surface configuration than that desired in the final bead surface.

From the foregoing it will be recognized by those skilled in the art that there is provided, in accordance with the present invention, an improved retro-reflective article having an undulant surface as well as a novel method of making the same. The method and article have the advantage that the retro-reflective beads or spheres may be impressed and, hence, permanently secured within the carrier to a desired and predictable depth, while at the same time the surface of the spheres will define an undulant pattern, being an approximate replica of the undulant substrate upon which the coating is supported.

From the above description it will be readily recognized by those skilled in the art that variations may be introduced in the materials selected, their physical characteristics, and the sequence of certain of the steps without departing from the spirit of the invention. Accordingly, the invention is to be broadly construed within the scope of the appended claims.

Having thus described the invention and illustrated its use, what is claimed as new and is desired to be secured by Letters Patent is:

1. The method of forming a reflex-reflective flexible article having an undulant surface portion defined by reflex-reflective spheres arrayed in an undulant pattern, which comprises the steps of providing a flexible web, having an undulant pattern on at least one surface, coating at least portions of said at least one surface with a tacky liquid layer of high shrink adhesive, said layer having an inner surface conforming to said at least one surface and having a substantially flat outer surface, said layer being of irregular thickness in accordance with the undulant pattern of said at least one surface of said web, covering said outer surface of said layer with reflex-reflective spheres, causing said spheres to be embedded into said layer to essentially equal depths, and thereafter causing said liquid adhesive layer to cure and shrink, thereby to deform said outer surface of said adhesive from an essentially flat to an undulant configuration.

2. The method in accordance with claim 1 wherein said adhesive layer has a thickness shrink factor of at least about 100%.

3. The method in accordance with claim 2 wherein said spheres are embedded into said layer by a pressure applied against said spheres in a direction generally normal to the surface of said layer.

4. The method in accordance with claim 3 wherein said spheres are embedded into said layer to a depth of at least about the equator of said spheres.

5. The method in accordance with claim 3 and including the step of partially curing said layer in advance of applying said pressure to said spheres.

6. The method in accordance with claim 1 wherein the thickness of said liquid layer is from about 3 to 6 times the diameter of said spheres.

7. The method in accordance with claim 6 wherein said layer is from about 0.01 to 0.015 inches in thickness and the average diameter range of said spheres is from about 0.0025 to 0.0035 inches.

8. The method of manufacturing an elongate flexible reflex-reflective article having an undulant surface comprising the steps of providing an elongate supply of web having at least one undulate surface and a second surface, coating at least portions of said undulate surface with a tacky liquid layer of high shrink adhesive, said layer having an under surface engaging said at least one surface and having a substantially flat outer surface, covering said outer surface of said tacky liquid layer with reflex-reflective spheres thereby to cause substantially the entirety of said outer surface of said layer to be covered by a single layer of said spheres resting thereon, partially curing said adhesive layer while supporting said web on said second surface, thereafter applying pressure against said spheres in a direction normal to the plane of said web to cause said spheres to be embedded in said partially cured layer to a depth at least equal to about the radius of said spheres, and thereafter causing said adhesive layer to cure and shrink, thereby to deform said outer surface of said adhesive from an essentially flat to an undulant configuration in accordance with the original thickness of said adhesive layer.

9. The method in accordance with claim 8 wherein said step of applying pressure against said spheres is effected by longitudinally tensioning said web and arraying said tensioned web over a roller with said spheres engaging said roller.

10. The method in accordance with claim 8 wherein the thickness of said cured layer of adhesive is about one half or less the thickness of the liquid adhesive layer before cure.

11. The method in accordance with claim 10 wherein the thickness of said liquid layer is from about three to six times the diameter of said spheres.

12. The method in accordance with claim 10 wherein said liquid layer is from about 0.01 to about 0.015 inches in thickness and the average diameter of said spheres is from about 0.0025 inches to about 0.0035 inches.

13. The method of forming a flexible retro-reflective article including a support web, an adhesive carrier layer and a plurality of retro-reflective spheres embedded into said layer to a preselected depth, which comprises the steps of progressively applying to one surface of a support web a layer of liquid polymeric adhesive, covering said liquid layer of adhesive with a mono layer comprised of a multiplicity of retro-reflective spheres to partially embed said spheres into said liquid layer, causing said liquid layer having said partially embedded spheres to be subjected to hardening influences while supporting said web by the uncoated surface thereof, thereby to increase the viscosity of said layer, inducing a longitudinally directed tension in said web to cause said web to advance along a path and thereafter causing said coated surface of said tensioned web to engage against a surface displaced from said path, thereby to apply a transverse force against said partially embedded spheres.

14. The method in accordance with claim 13 and including the step of providing a plurality of rollers having parallel axes of rotation, said axes being offset one from the other, advancing said web across said at least some of said rollers with said uncoated surface of said web engaging the surface of said at least some rollers, inverting said web and advancing the same with the coated surface of said web engaging said rollers, thus to embed said spheres in said layer.

* * * * *